(12) United States Patent
Graff et al.

(10) Patent No.: US 12,522,122 B2
(45) Date of Patent: Jan. 13, 2026

(54) GRAIN CART STRUCTURE AND METHOD OF MAKING SAME

(71) Applicant: Brandt Industries Canada Ltd., Regina (CA)

(72) Inventors: Lyndon Graff, Craven (CA); Maxwell Ziegler, Regina (CA)

(73) Assignee: Brandt Industries Canada Ltd., Regina (CA)

( * ) Notice: Subject to any disclaimer, the term of this patent is extended or adjusted under 35 U.S.C. 154(b) by 615 days.

(21) Appl. No.: 17/966,983

(22) Filed: Oct. 17, 2022

(65) Prior Publication Data

US 2024/0123892 A1    Apr. 18, 2024

(51) Int. Cl.
| | |
|---|---|
| *B60P 3/00* | (2006.01) |
| *A01D 90/10* | (2006.01) |
| *B60D 1/48* | (2006.01) |
| *B60P 1/40* | (2006.01) |
| *B62D 21/02* | (2006.01) |

(52) U.S. Cl.
CPC ............... *B60P 3/00* (2013.01); *A01D 90/10* (2013.01); *B60D 1/48* (2013.01); *B60P 1/40* (2013.01); *B62D 21/02* (2013.01)

(58) Field of Classification Search
CPC .. B60P 3/00; A01D 90/10; B60D 1/48; B62D 21/02
USPC .......................................................... 298/24
See application file for complete search history.

(56) References Cited

PUBLICATIONS

Elmers Haul Master—Farm Grain Cart, Buggy, Bin With Optional Tracks; youtube.com video; https://www.youtube.com/watch?v=1LCeMDctnel; Elmer's Manufacturing Ltd.; accessed Jun. 23, 2025; published Feb. 20, 2015. (Year: 2015).*
Davimac; "Davimac Chaser Bin Parts List"; From CB2811 to CB6613, Aug. 2011, 13 pages.
Kondinin; "Research Report, 30t+Chaser Bins", Feb. 2019, No. 109, "www.farmingahead.com.au", 36 pages.

* cited by examiner

*Primary Examiner* — Amy R Weisberg
*Assistant Examiner* — Philip Charles Adams
(74) *Attorney, Agent, or Firm* — Frost Brown Todd LLP; Nicole M. Tepe

(57) ABSTRACT

A grain cart is provided with an internal frame and a method of constructing a grain cart with an internal frame is provided. The grain cart can have a support frame, ground wheels, a hitch assembly, and a storage hopper supported on the support frame. The storage hopper can have a spine member running along the center portion, corresponding pairs of rib members connected at intervals along the spine member and a plurality of panels connected between adjacent rib members. The storage hopper can be constructed by connecting a plurality of rib members to a spine member, connecting a cross brace across corresponding pairs of rib members, inserting panels between adjacent rib members, and connecting the panels to rib members.

26 Claims, 15 Drawing Sheets

GRAIN CART STRUCTURE AND METHOD OF MAKING SAME

The present invention relates to a grain cart and more particularly the structure of a grain cart and a method of constructing a grain cart.

BACKGROUND

Grain carts are typically used to transfer grain or other crop material from a combine harvester to a grain truck or bin. The grain cart typically comprises a storage hopper for particulate material, an auger assembly for emptying particulate material from the storage hopper and a set of ground wells (sometimes with tracks) so that the grain cart can be towed. A tractor is commonly used to tow the grain cart and the auger assembly of the grain cart can be driven off the power take off (PTO) of the tractor (although hydraulics, etc. could also be used to power the auger assembly).

In use, the grain cart is towed by the tractor to a combine harvester where the particulate material is unloaded from the combine harvester into the grain cart. With the particulate material loaded into the storage hopper of the grain cart, the tractor can tow the grain cart to a truck, trailer, storage bin, etc. and use the auger assembly to unload the particulate material from the grain cart into the truck, trailer, storage bin, etc.

Grain, or other particulate material, in the storage hopper is typically directed, by the walls of the storage hopper, towards a center portion in the bottom of the storage hopper where a transport assembly, such as an auger or conveyor belt, is provided (typically through openings in the bottom of the storage hopper). This transport assembly can carry the particulate material to the front of the grain cart to an auger at the front of the auger. Once this particulate material reaches the auger, the auger can carry the particulate material up the auger to be discharged out a discharge end, into a truck, trailer, storage bin, etc.

Grain carts are typically large and relatively complex to assemble. The grain bin, including the walls of the storage hopper, also have to be strong enough to contain what can be a very heavy load of particulate material. It is therefore desirable to have a structure for a grain cart and method of manufacturing the grain cart, that is relatively straightforward to assemble, but structurally strong enough to carry a load of particulate material.

SUMMARY OF THE INVENTION

In a first aspect, a grain cart is provided having a support frame, ground wheels operatively attached to the support frame, a hitch assembly connected to a front of the support frame, a storage hopper supported on the support frame, an auger assembly, and a transport assembly provided beneath the storage hopper and leading to the auger assembly. The storage hopper having: side walls; end walls; an interior portion defined by the side walls and the end walls; a center portion at a bottom of the storage hopper; a spine member running along the center portion; corresponding pairs of rib members connected at intervals along the spine member; and a plurality of panels connected between adjacent rib members on a same side of the spine member to form the side walls.

In a second aspect, a method of constructing a storage hopper for a grain cart is provided. The method includes connecting a plurality of rib members to a spine member to form corresponding pairs of rib members on opposing sides of the spine member, connecting a cross brace across each corresponding pair of rib members, inserting panels between adjacent rib members on a same side of the spine member so that apertures in the connection flanges of the panel align with flange apertures in the rib members, and connecting the panels to rib members.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
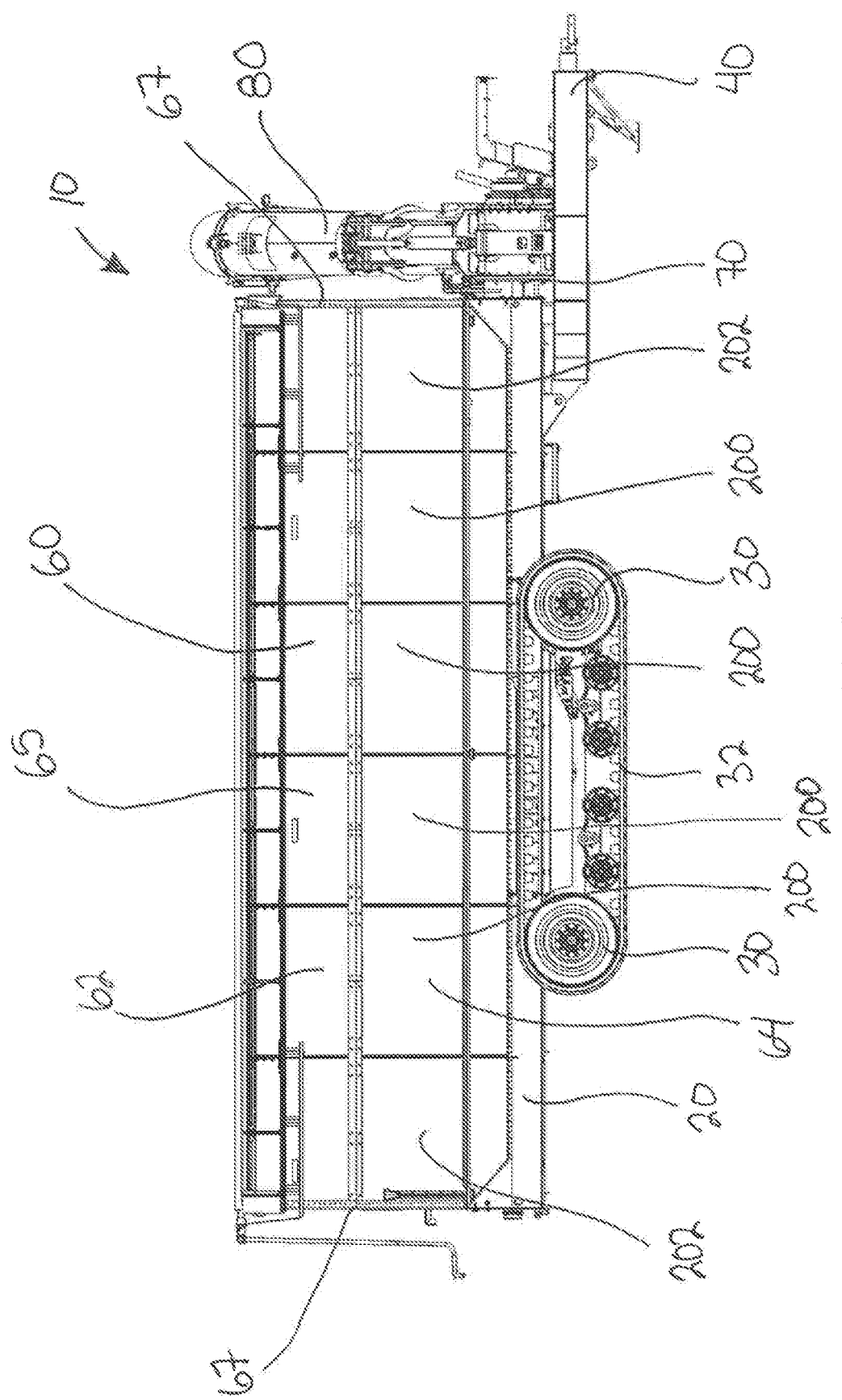
FIG. 1 is a side view of a grain cart.
Figure 2:
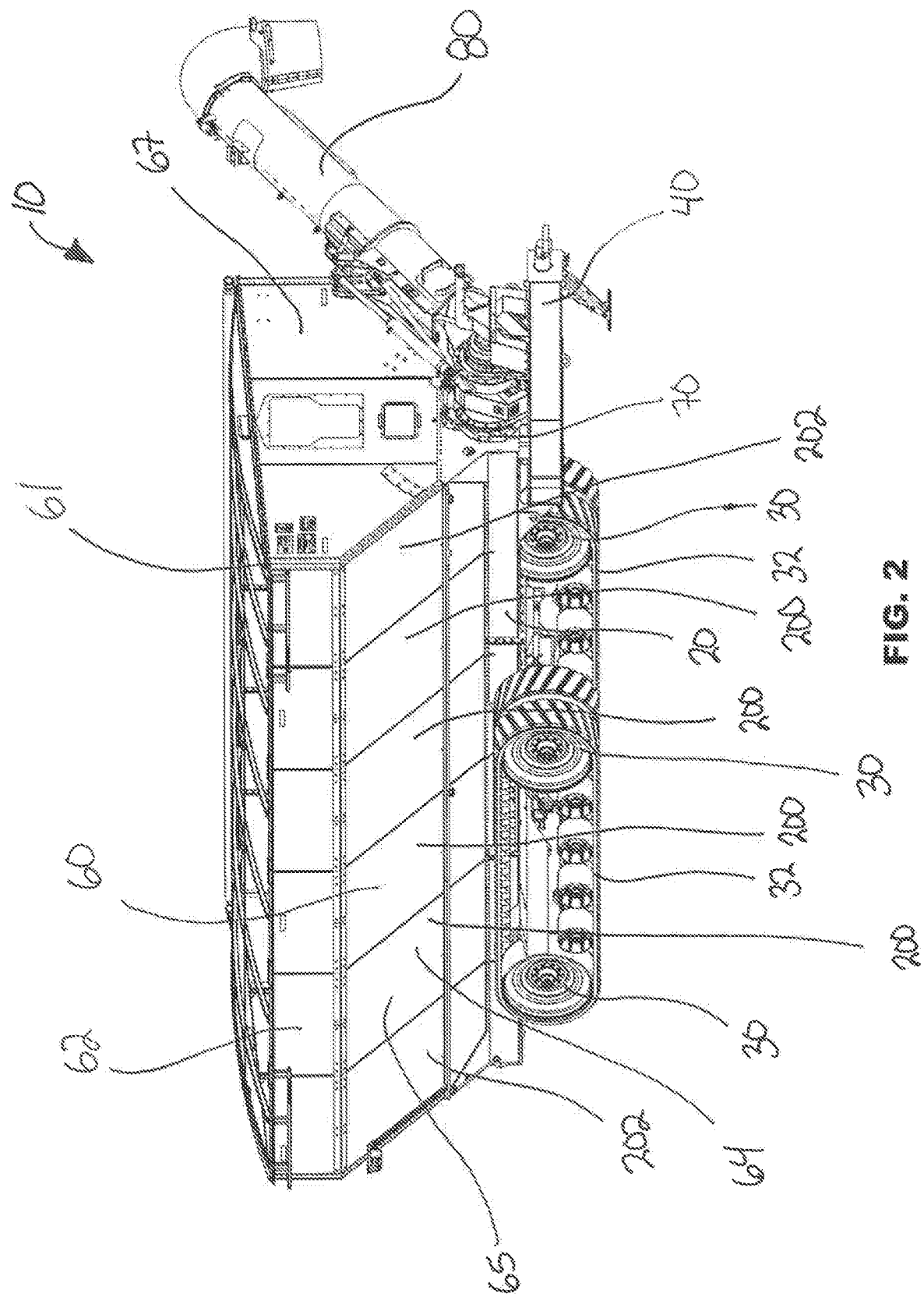
FIG. 2 is an isometric view of the grain cart of FIG. 1.
Figure 3:
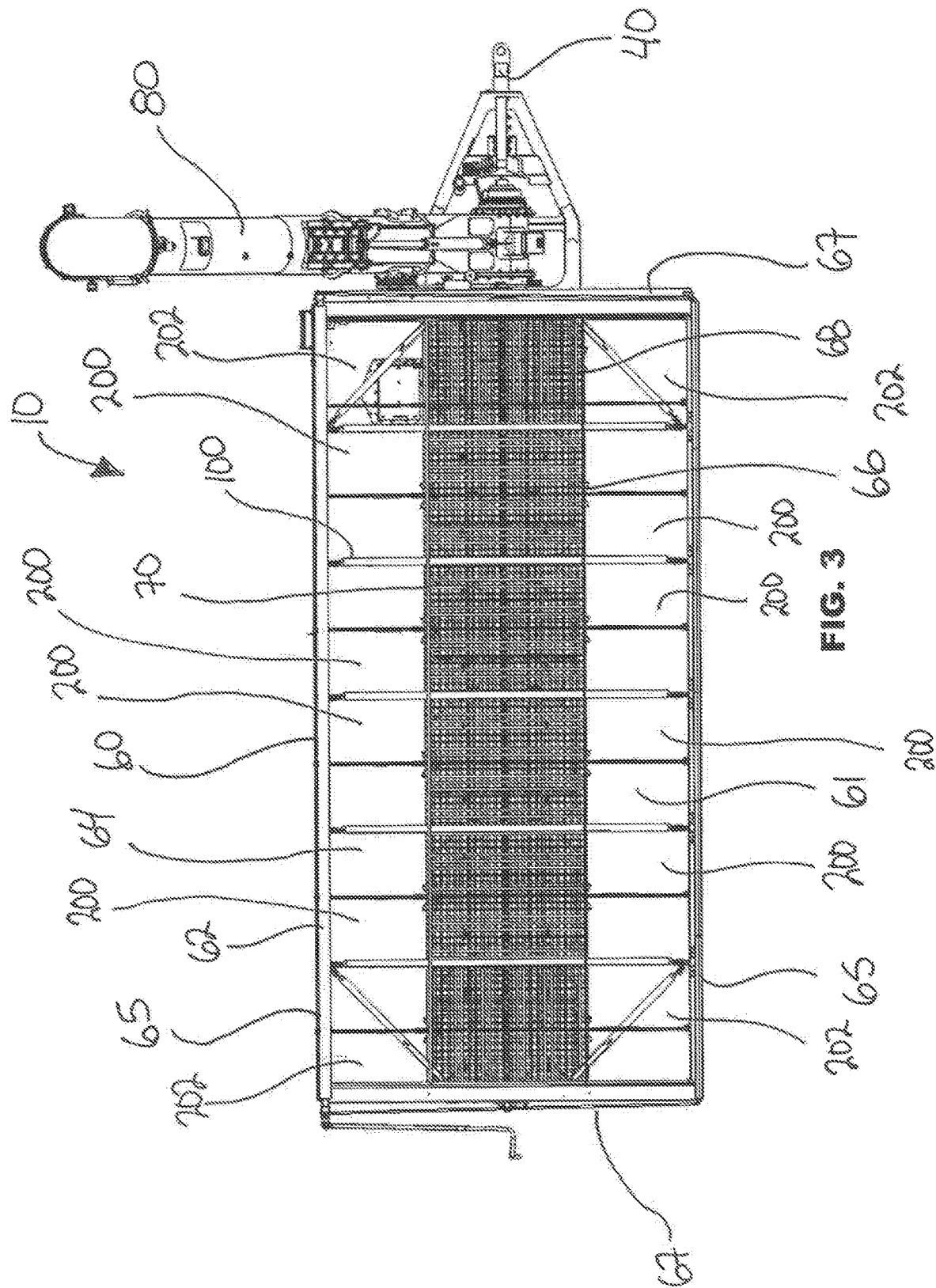
FIG. 3 is an interior view of the grain cart of FIG. 1.

FIGS. 1-3 illustrate a grain cart 10 for transporting particulate material, such as grain or other crop material. In one aspect, the grain cart 10 can be used to transport particulate material, such as crop material, from a combine in a field to a grain truck or trailer. The grain cart 10 can have a support frame 20, ground wheels 30, a hitch assembly 40, a storage hopper 60 for storing particulate material, a transport assembly 70, and an auger assembly 80.

Particulate material can be loaded into the storage hopper 60, through an open top of the storage hopper 60, for transport to another location. When the grain cart 10 has been towed by a tow vehicle to another location, the transport assembly 70 and the auger assembly 80 can be used to unload the particulate material from the storage hopper 60 on the grain cart 10.

Figure 10:
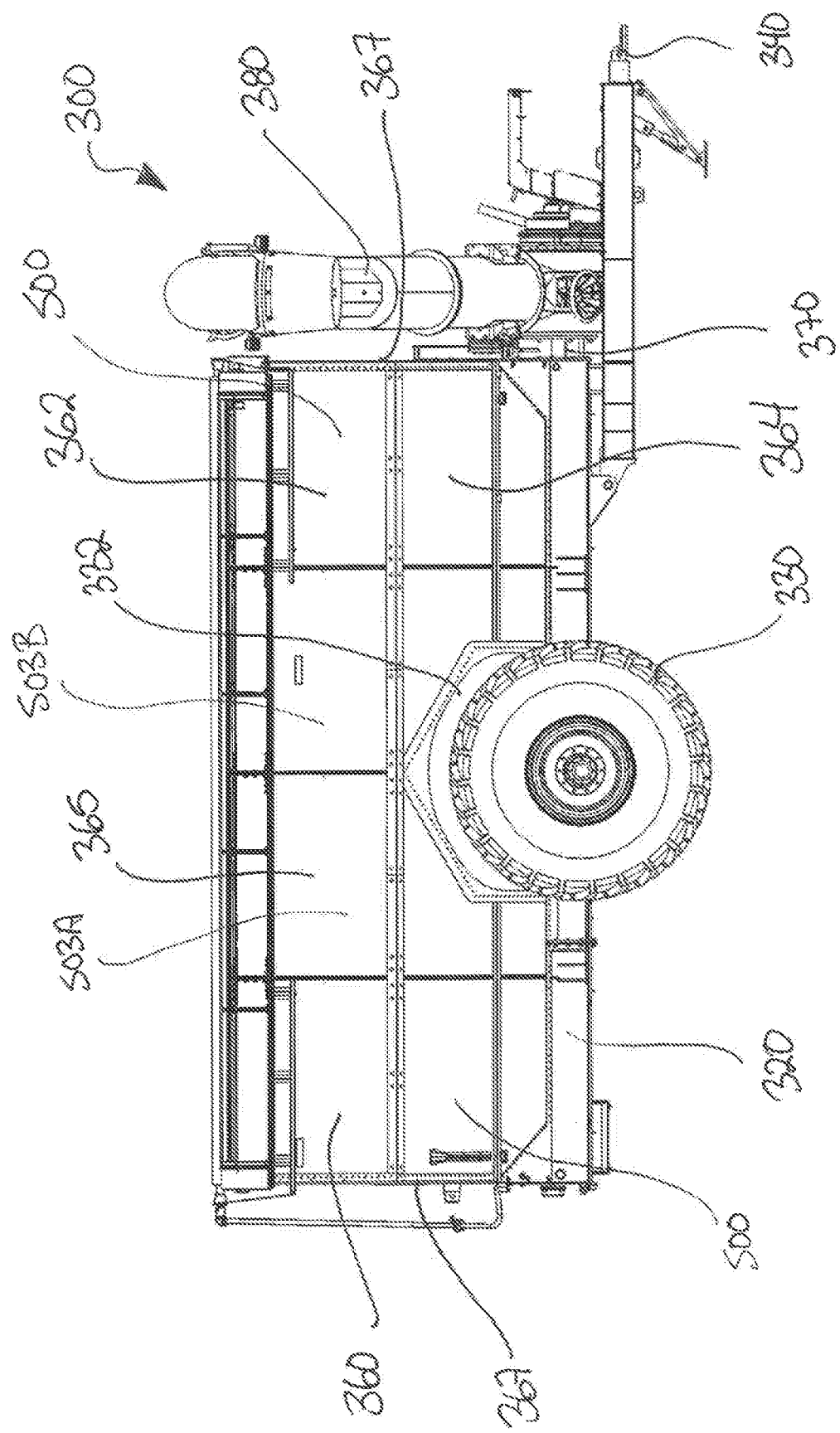
FIG. 10 is a side view of a grain cart in a further aspect.
Figure 11:
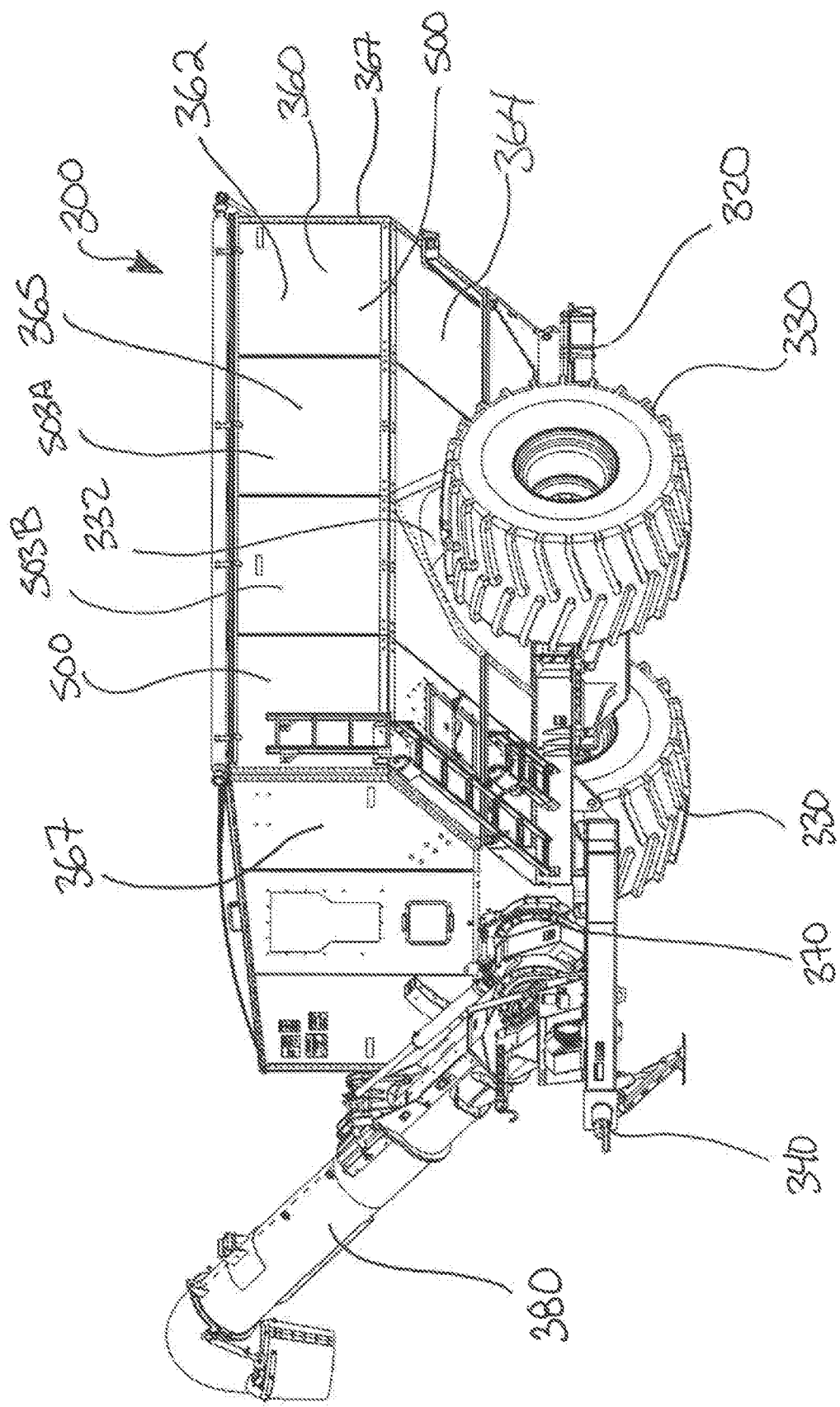
FIG. 11 is an isometric view of the grain cart of FIG. 10.
Figure 12:
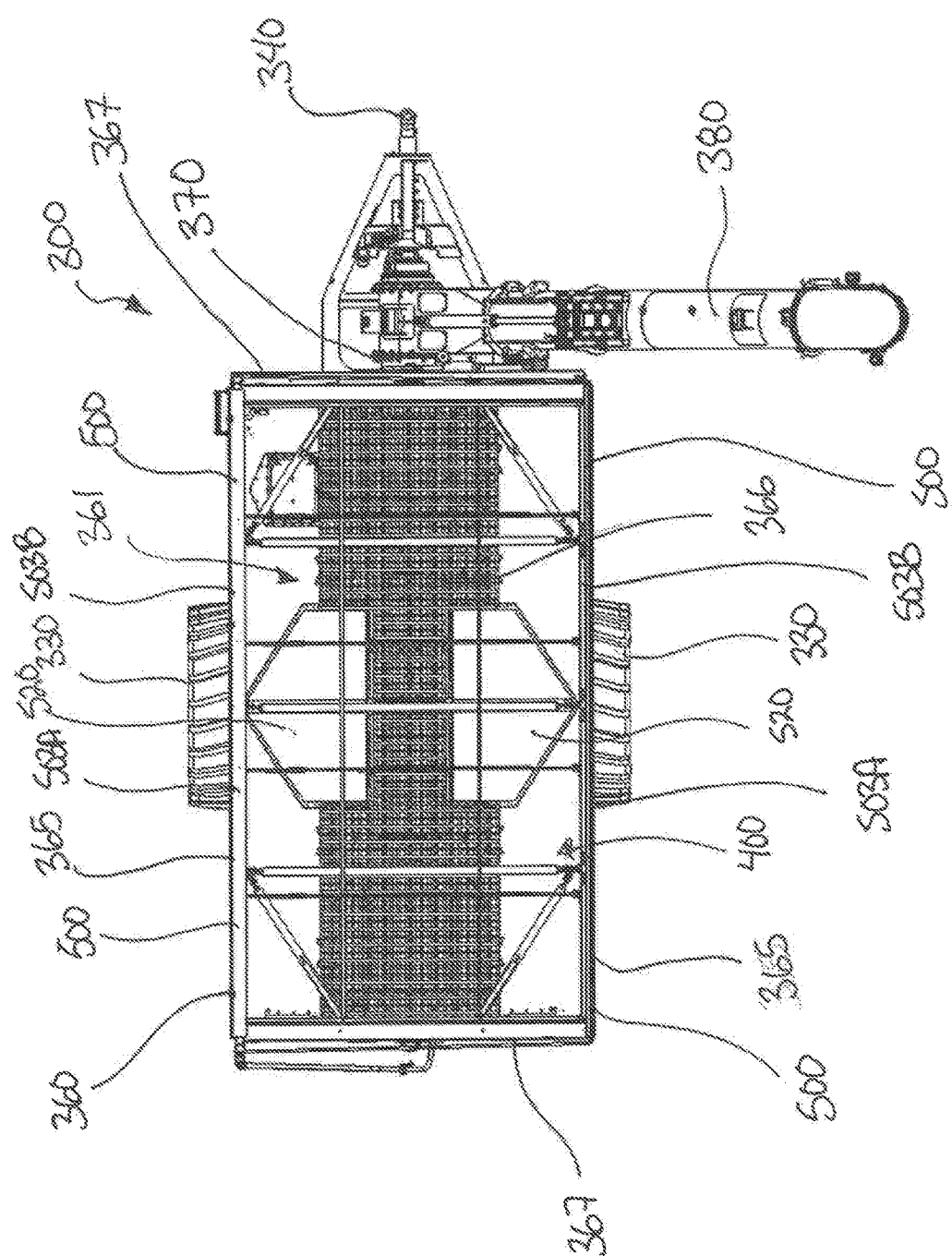
FIG. 12 is an interior view of the grain cart of FIG. 10.

The support frame 20 can support the storage hopper 60 and the ground wheels 30 can be operatively attached to the support frame 20. A pair of ground wheels 30 per side can be provided, and, in the grain cart 10, treads 32 are provided encircling the ground wheels 30, but there may also be ground wheels without treads, such as ground wheels 330 as shown in FIGS. 10-12.

The hitch assembly 40 can be connected to the front of the support frame 20 and the hitch assembly 40 can then be hitched to a tow vehicle, such as a tractor (not shown), to tow the grain cart 10.

The storage hopper 60 can have an interior portion 61 for storing particulate material defined by side walls 65 and end walls 67 of the storage hopper 60. Each side wall 65 can have an upper side wall 62 and a lower side wall 64. The upper side walls 62 of the storage hopper 60 can be substantially vertical while the lower walls 64 can be angled inwards to direct particulate material into a center portion 66 at the bottom of the storage hopper 60.

Referring to FIG. 3, the side walls 65 can be supported by an internal framework 100. Particulate material loaded into the storage hopper 60 will be directed by gravity towards the center portion 66 in the bottom of the storage hopper 60 and through openings 68 leading to the to the transport assembly 70 to be conveyed to the auger assembly 80 and the front of the grain cart 10.

Referring again to FIGS. 1-3, the transport assembly 70 can be used to move particulate material that has fallen through the openings 68 and into the transport assembly 70 to the auger assembly 80. In some aspects, the transport assembly 70 can be an auger or a conveyor belt that transports the particulate material along the transport assembly 70 to the auger assembly 80. Once the particulate material reaches the auger assembly 80, the particulate material can be lifted up the auger assembly 80 and discharged out an end of the auger assembly 80.

Figure 4:
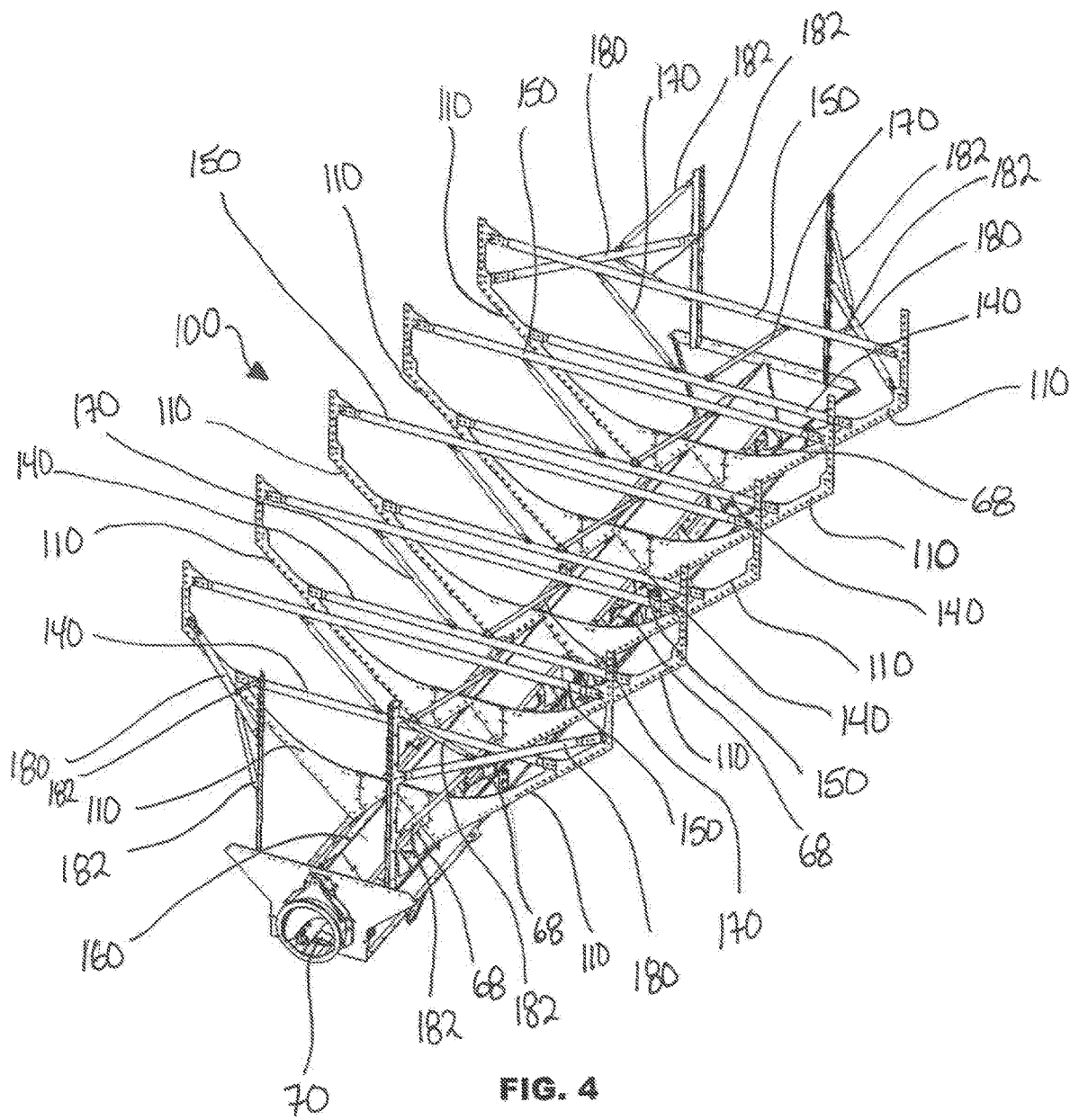
FIG. 4 is an isometric view of an internal framework of the grain cart of FIG. 1.
Figure 6:
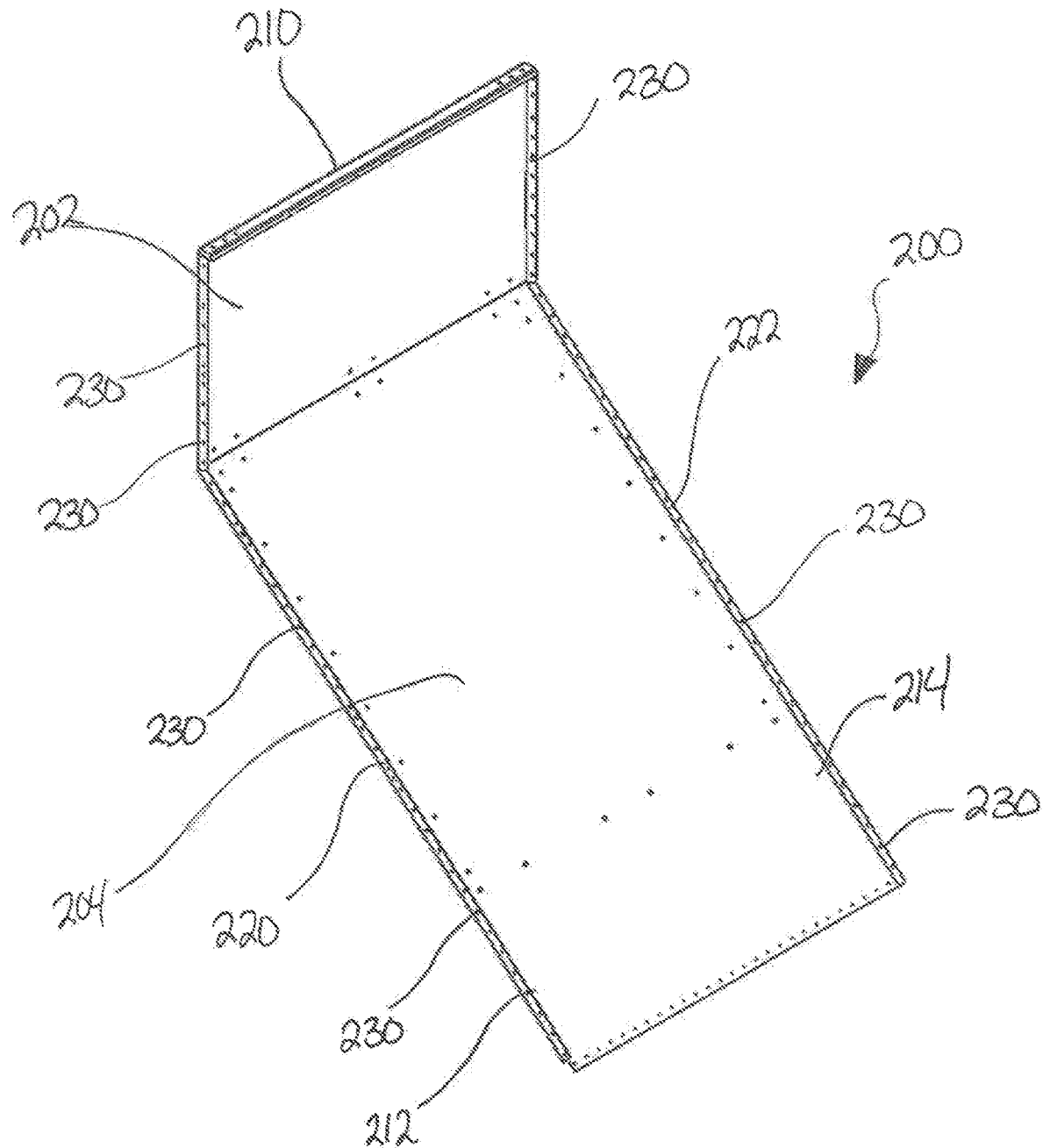
FIG. 6 is an isometric view of a panel for creating a lower side wall of the grain cart shown in FIG. 1.

FIG. 4 illustrates the internal framework 100 for the grain cart 10. The internal framework 100 can be used to support a series of panels 200 as shown in FIG. 6. The internal framework 100 can include a plurality of rib members 110, a plurality of lower cross braces 140, a plurality of upper cross braces 150, end wall braces 180 and a spine member 160.

The spine member 160 can run along the center portion 66 in the bottom of the storage hopper 60 and over top of the transport assembly 70. The openings 68 in the center portion 66 of the storage hopper 60 can be provided in the spine member 160. In one aspect, an opening 68 can provided between each adjacent pair of rib members 110 along one side of the spine member 160. The spine member 160 can run from a front end to a back end of the storage hopper 60.

Figure 5:
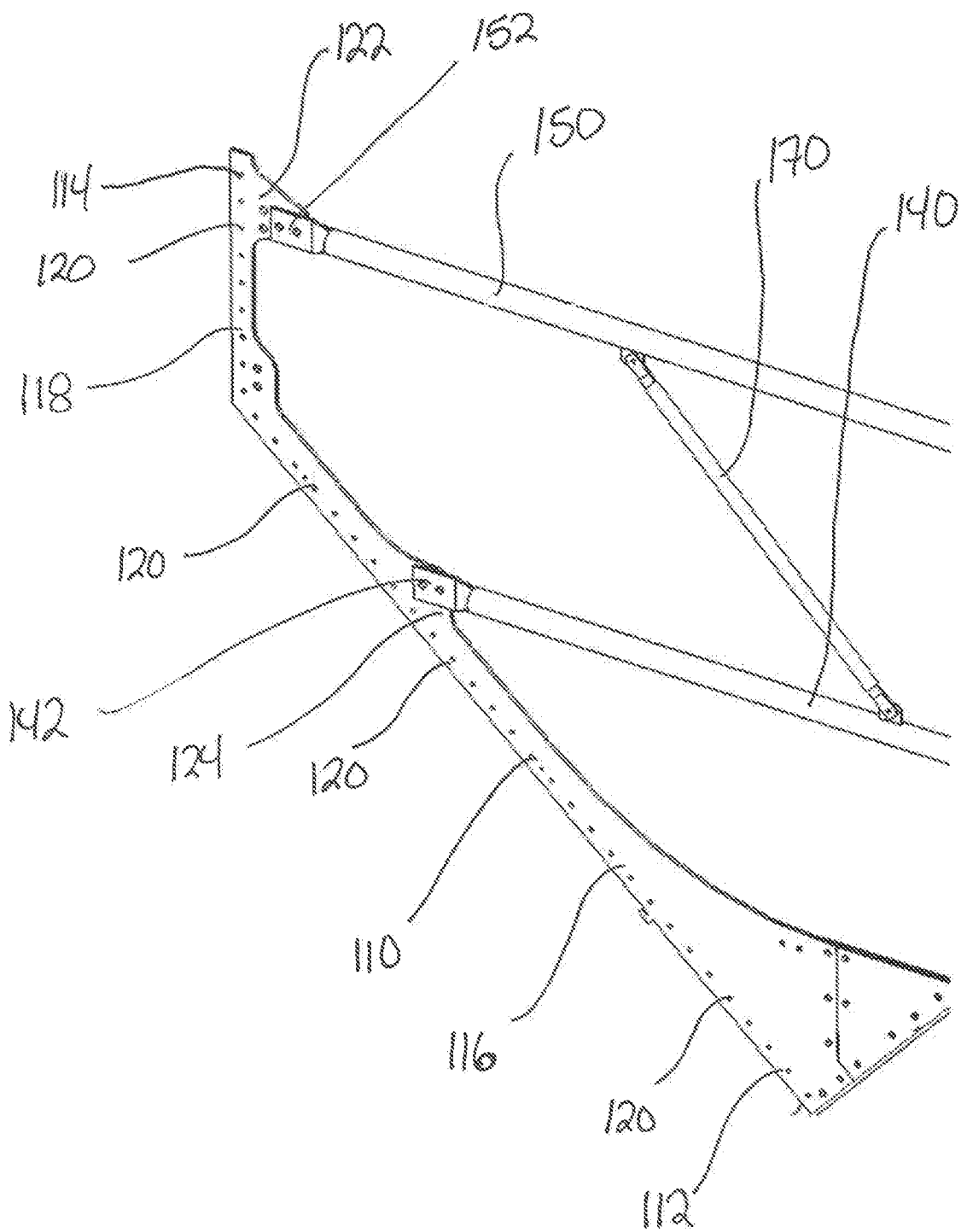
FIG. 5 is a front view of a rib member of the internal frame shown in FIG. 4.

The rib members 110 can be connected to the spine member 160 at regular intervals, with the regular intervals matching the width of the panels 200 to be installed between adjacent rib members 110. Referring to FIG. 5, each rib member 110 can have a bottom end 112 and a top end 114, with a slanted lower portion 116, proximate the bottom end 112 of the rib member 110, and a substantially vertical upper portion 118, proximate a top end 114 of the rib member 110. The slanted lower portion 116 of the rib member 110 will correspond to the lower walls 64 of the storage hopper 60, while the upper portion 118 of the rib member 110 will correspond to the upper wall 64 of the storage hopper 60.

Flange apertures 120 can run along an outside periphery of the rib members 110 to allow attachment of the panel 200 to the rib member 110.

An upper cross brace connection bracket 122 can be provided on the rib member 110, proximate the top end 114 of the rib member 110, and a lower cross brace connection bracket 124 can be provided on the rib member 110 below the upper cross brace connection bracket 122. In one aspect, the upper cross brace connection bracket 122 can be provided in the upper portion 118 of the rib member 110 and the lower cross brace connection bracket 124 can be provided in the lower portion 116 of the rib member 110.

Referring again to FIG. 4, the rib members 110 can be connected as corresponding pairs to the spine member 160, with each rib member 110 in a corresponding pair connected on opposing sides of the spine member 160.

The upper cross braces 150 and the lower cross braces 140 can add structural strength to the internal frame 100. An upper cross brace 150 can attach to each corresponding pair of rib members 110 at their upper cross brace connection brackets 122, thereby connecting each corresponding pair of rib members 110 with the upper cross brace 150 near the top ends 114 of the pair of rib members 110 and a lower cross brace 140 can attach to each corresponding pair of rib members 110 at their lower cross brace connection brackets 124, thereby connecting each pair of rib members 110 with the lower cross brace 140, below the upper cross brace 150 and above the bottom ends 112 of the pair of rib members 110.

The ends of the upper cross braces 150 can have connection flanges 152 that mate with the upper cross brace connection brackets 122 on the rib members 110 and the ends of the lower cross braces 140 can have connection flanges 142 that mate with the lower cross brace connection brackets 124 on the rib members 110.

The upper cross braces 150 and the lower cross braces 140 can have rounded cross-sections to allow particulate material to flow over the upper cross braces 150 and the lower cross braces 140 easily when the particulate material is discharged into the storage hopper 60 and prevent any of the particulate material from getting hung up on the upper cross braces 150 or the lower cross braces 140.

Bracing members 170 can be connected between the upper cross brace 150 and the lower cross brace 140 connecting a corresponding pair of rib members 110 to further add rigidity.

End wall braces 180 can be provided connected to the last corresponding pair of rib members 110 on each end of the spine member 160 and running towards the end walls 67 of the storage hopper 60. End braces 182 can be connected between the end wall braces 180 and the end walls 67.

FIG. 6 illustrates a panel 200 for forming the side walls 65 of the storage hopper 60. The panel 200 can have sides 212, 214, an outer surface 210 and an inner surface 211. Connection flanges 220, 222 can run along each side 212, 214 of the outer surface 210.

Apertures 230 can be provided in the connection flanges 220, 222. The apertures 230 can align with the flange apertures 120 in the outside periphery 116 of a rib member 110 when the panel 200 is positioned between adjacent rib members 110 along one side of the spine member 160.

A top section 202 of the panel 200 can be substantially vertical and correspond to the upper side wall 62 of the storage hopper 60 and a lower section 204 of the panel 200 can be angled and correspond to the lower side wall 64 of the storage hopper 60. In another aspect, the top section 202 and the lower section 204 may be separate panels, instead of sections of a single panel 200.

Referring to FIG. 4, the internal framework 100 and panels 200 can be used to construct the storage hopper 60 of the grain cart 10. The rib members 110 can be first connected to the spine member 160 so that they form pairs of rib members 110 spaced apart at regular intervals along the spine member 160.

With the rib members 110 attached to the spine member 160, the upper cross braces 150 and the lower cross braces 140 can be connected across corresponding pairs of rib members 110 to form the internal framework 100. For each corresponding pair of rib members 110, an upper cross brace 150 can be connected between the upper cross brace connection brackets 122 on the pair of rib members 110 and a lower cross brace 140 can be connected between the lower cross brace connection brackets 124 on the pair of rib members 110.

In one aspect, bracing members 170 can be connected between the upper cross braces 150 and the lower cross braces 140 of corresponding pairs of rib members 110.

Figure 7:
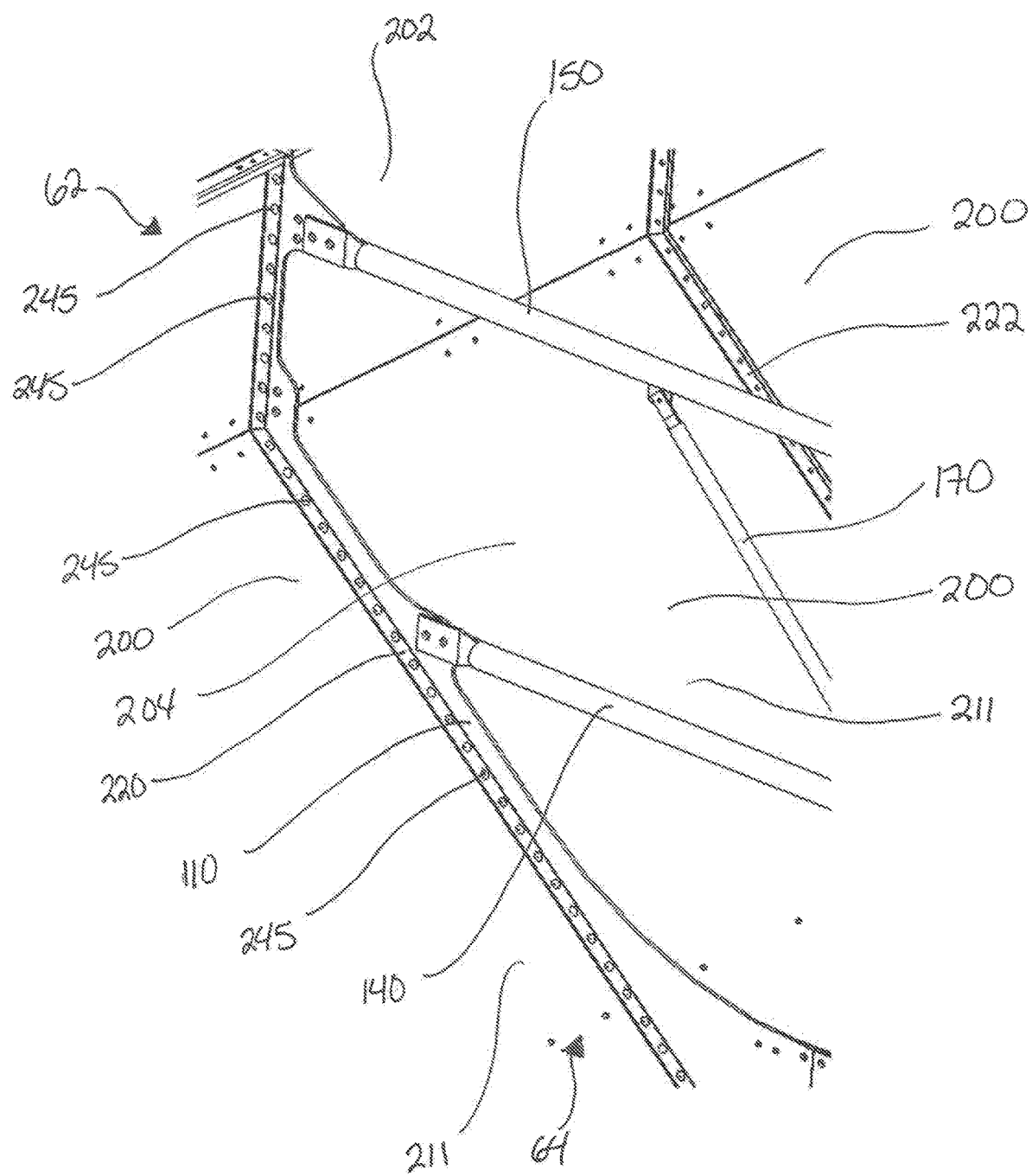
FIG. 7 is a close up view of panels connected to a rib member of an internal frame.

With the internal framework 100 assembled, as shown in FIG. 4, panels 200 can be inserted between adjacent rib members 110 on each side of the spine member 160. Referring to FIG. 7, each panel 200 can be inserted between adjacent rib members 110 on the same side of the spine member 160 with the connecting flanges 220, 222 of the panel 200 adjacent to the rib members 110 and the apertures 230 in the connection flanges 220, 222 of the panel 200 aligned with the flange apertures 120 in rib member 110. Connectors 245 such as bolts/nuts or rivets, can then be inserted through the aligned apertures 230 and flange apertures 120 and secured in place, to secure the panels 200 in place between the rib members 110.

The top section 202 of the panel 200 can form part of the upper side wall 62 of the storage hopper 60 and the lower section 204 of the panel 200 form part of the lower side wall 64 of the storage hopper 60.

Figure 8:
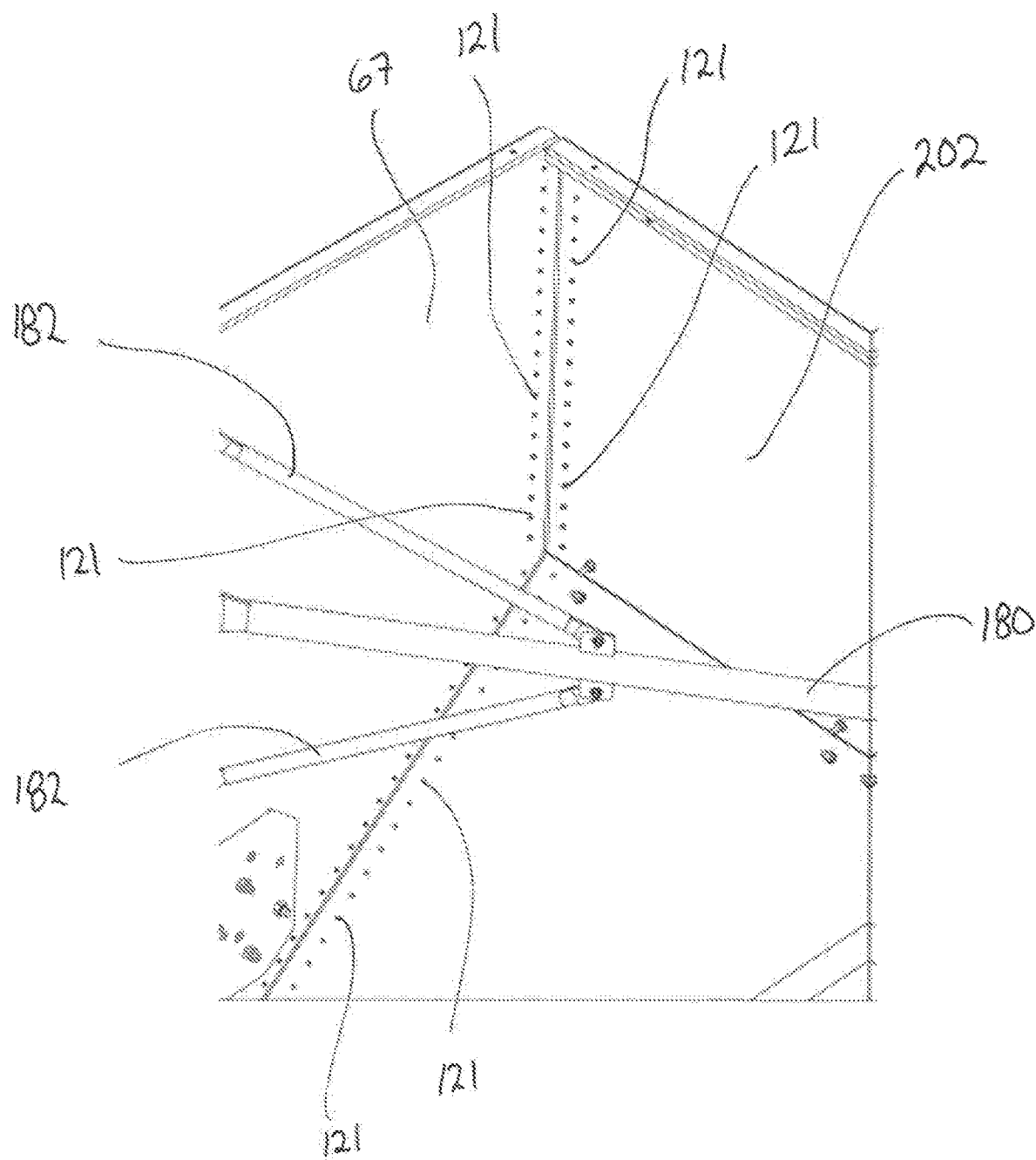
FIG. 8 is an close up view of the interior of the storage hopper showing and end wall connected to a side of a panel.
Figure 9:
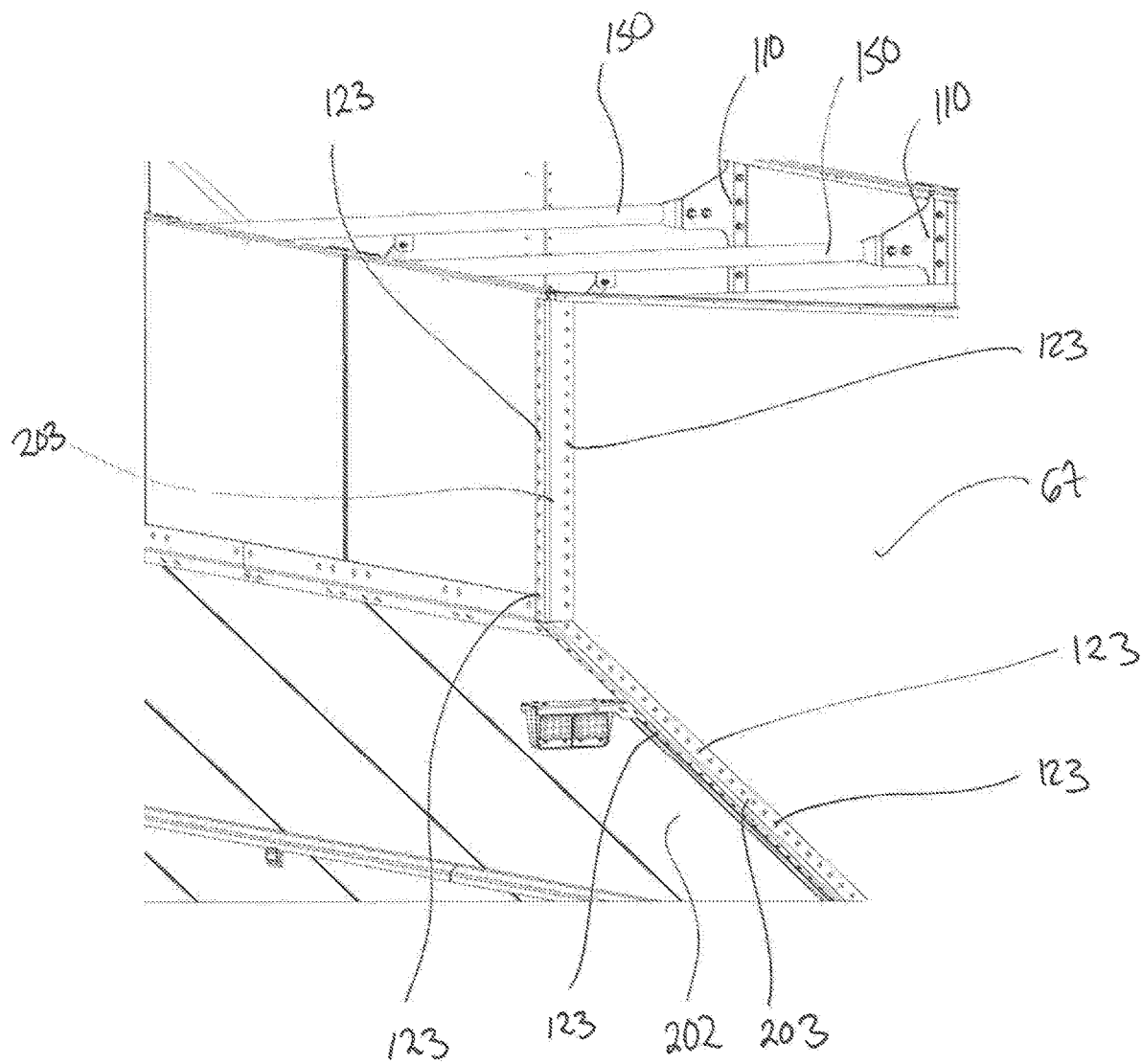
FIG. 9 is a close up view of an outside corner of the storage hopper.

End walls 67 can be installed at the front end and the back end of the storage hopper 60 by abutting the end wall 67 to ends of a panel 202 on either end of the storage hopper 60. Referring to FIG. 8, the panel 202, rather than having a flange member on one end, can have apertures 121 running through the panel 202. Referring to FIG. 9, angle bars 203 can be used to form the outside corners connecting the panels 202 and the end walls 67 and connectors 123, such as rivets, can be used to secure the end wall 67 to the end of the panel 202. Referring again to FIG. 8, the end wall braces 180 can be connected to the end walls 67 and the end braces 182 can be connected between the end wall braces 180 and the end walls 67.

Referring to FIGS. 1-7, the outer surfaces 210 of each panel 200 can be substantially aligned with the outer surfaces 210 of the adjacent panels 200 so that the outer surfaces 210 of the panels 200 are substantially flush. The flange apertures 120 are oriented close enough to the outside periphery 116 of the rib members 110 of the rib member 110 that the rib member 110 does not extend beyond the outer surfaces 210 of the adjacent panels 200 when these adjacent panels 200 are connected to the rib member 110. This allows the outer surface 210 of one panel 200 to be substantially aligned with the outer surface 210 of the adjacent panel 200, without the rib member 110 extending past these outer surfaces 210 and interrupting the transition from the outers surface 210 of one panel 200 to the next panel 200.

The connectors 145 securing the panels 200 to an internal rib 110 are oriented parallel to the inner surfaces 211 of the panels 200 and on a face, the rib member 110 and the connection flanges 220, 222 of adjacent panels 200, oriented perpendicular to the flow of particulate material as if flows down the inner surfaces 211 of the panels 200, reducing the obstruction of the flow path of the particulate material as it flows down the sloped lower wall 64.

FIGS. 10-12 illustrates a grain cart 300, in another aspect, that uses an internal framework 400 and panels 500, 503A and 503B to construct a storage hopper 360 of the grain cart 300, but unlike the grain cart 10 shown in FIGS. 1-9, grain cart 300 has large ground wheels 330, necessitating the use of wheel wells 332 that intrude into the storage hopper 360. The grain cart 300 can also have a support frame 320, a hitch assembly 340, a transport assembly 370, and an auger assembly 380. The storage hopper 360 can have an interior portion 361 for storing particulate material defined by side walls 365 and end walls 367 of the storage hopper 360. Each side wall 365 can have an upper side wall 362 and a lower side wall 364. The upper side walls 362 of the storage hopper 360 can be substantially vertical while the lower walls 364 can be angled inwards to direct particulate material into a center portion 366 at the bottom of the storage hopper 360.

The side walls 365 can be supported by an internal framework 400. Particulate material loaded into the storage hopper 360 will be directed by gravity towards the center portion 366 in the bottom of the storage hopper 360 and through openings 368 leading to the to the transport assembly 370 to be conveyed to the auger assembly 380 and the front of the grain cart 300.

Figure 13:
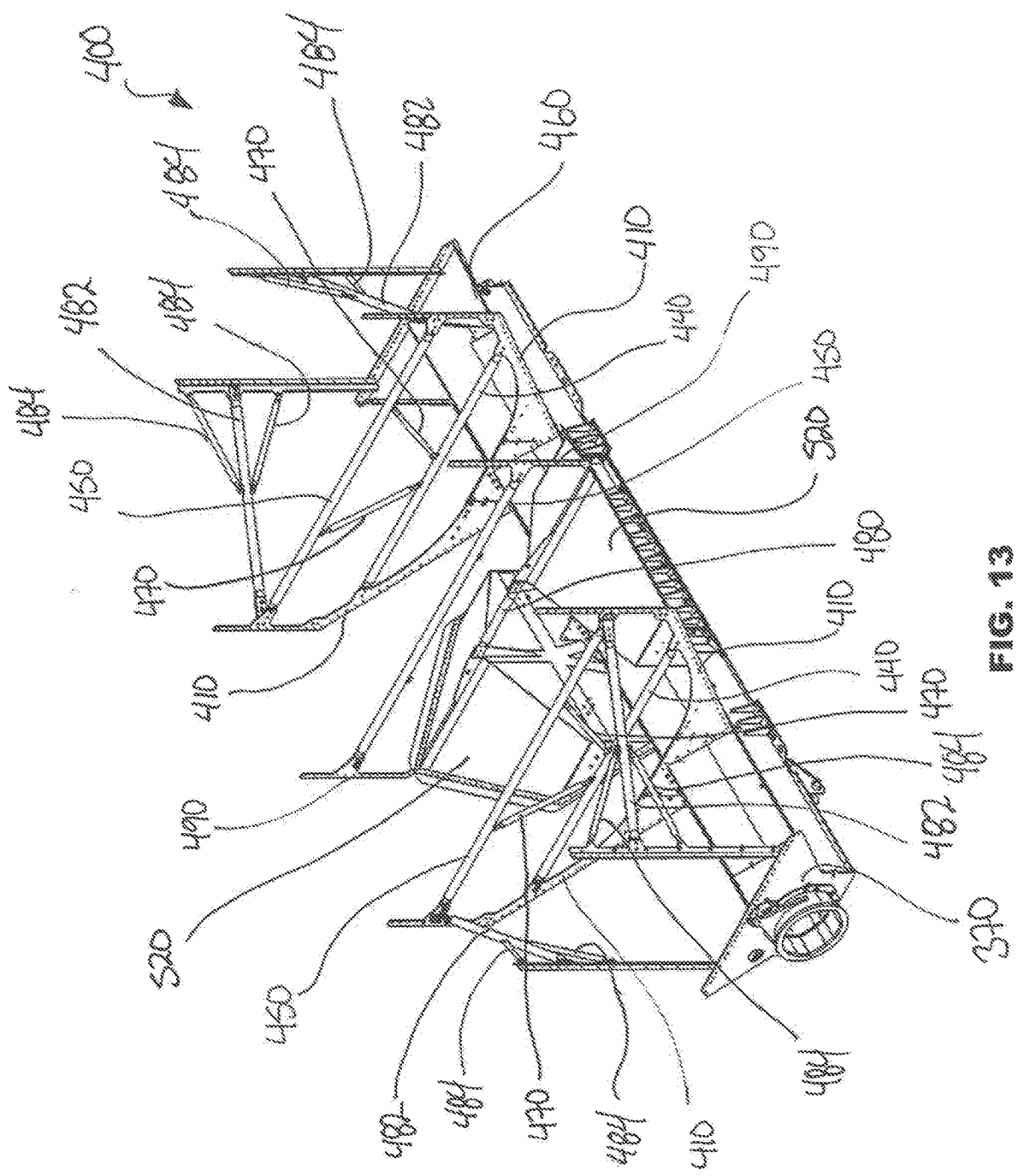
FIG. 13 is an isometric view of an internal framework of the grain cart of FIG. 10.

FIG. 13 illustrates an internal framework 400 for the grain cart 300. The internal framework 400 can be used to support panels 500, 503A, and 503B as shown in FIGS. 10-12. The internal framework 400 can include a plurality of rib members 410, a plurality of lower cross braces 440, a plurality of upper cross braces 450, a spine member 460, a lower wheel well brace 480, wheel well rib member 490, and wheel well members 520.

Like the spine member 160 in the grain cart 10, the spine member 460 can run along the center portion 366 in the bottom of the storage hopper 360 and over top of the transport assembly 370. The openings 368 in the center portion 366 of the storage hopper 360 can be provided in the spine member 460. The spine member 460 can run from a front end to a back end of the storage hopper 360.

Figure 14:
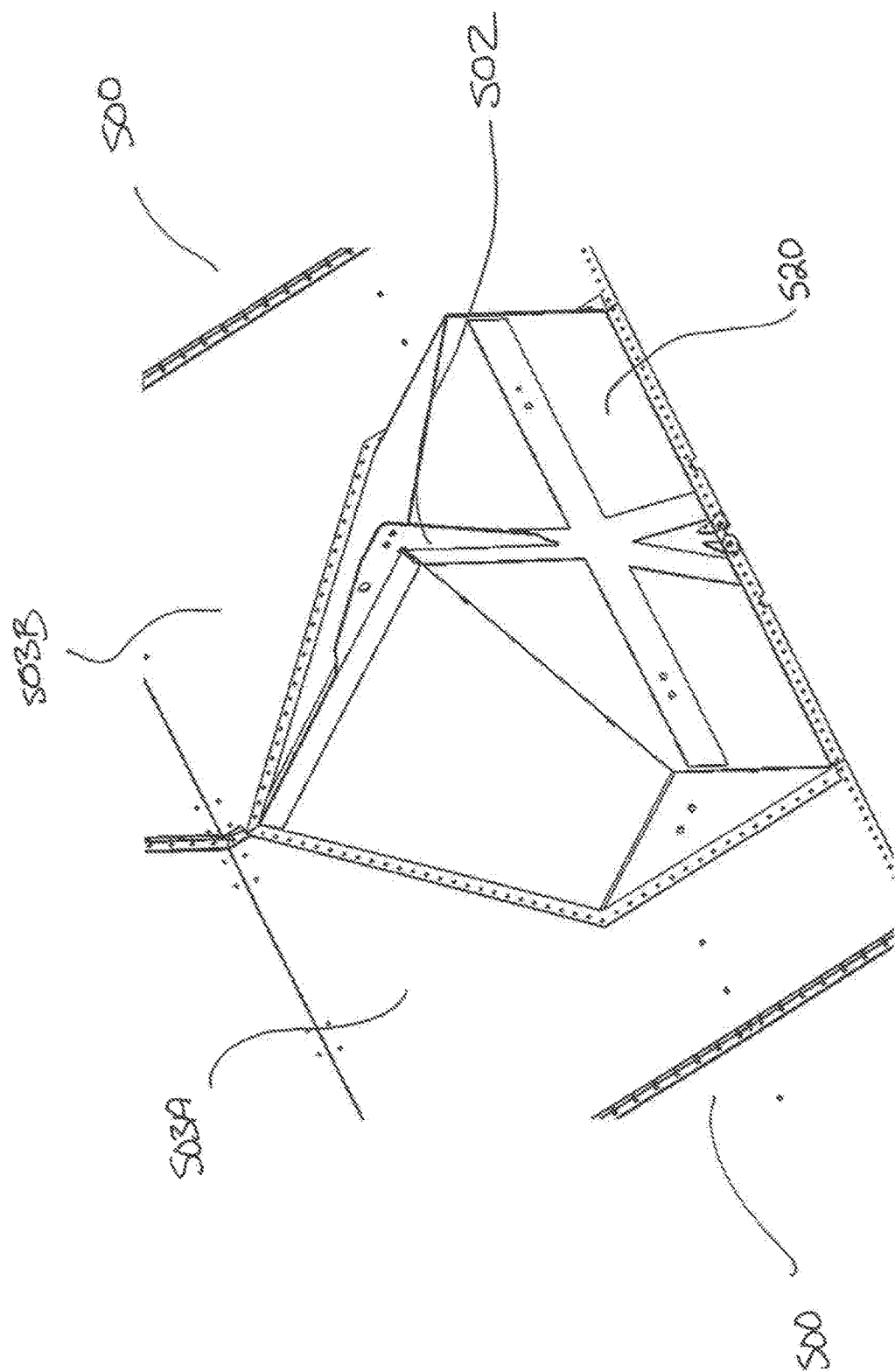
FIG. 14 is an isometric view of a wheel member.

A wheel well member 520 can be connected to each side of the spine member 460 to form the wheel wells 332 that will provide clearance in the storage hopper 360 for the ground wheels 330. FIG. 14 illustrates one of the wheel well members 520. The wheel well member 520 can be formed of panels with a lower cross brace well connection bracket 502 for connecting to the lower wheel well brace 480.

Referring again to FIG. 13, rib members 410 can be connected to the spine member 460 in front of and behind the wheel well members 520. The rib members 410 can be similar to the rib members 110 on the grain cart 10 and can be connected as corresponding pairs to the spine member 460, with each rib member 410 in a corresponding pair connected on opposing sides of the spine member 460.

The upper cross braces 450 and the lower cross braces 440 can be connected across a corresponding pair of rib members 410 to add structural strength to the internal framework 400.

Bracing members 470 can be connected between the upper cross brace 450 and the lower cross brace 440 connecting a corresponding pair of rib members 110 to further add rigidity.

End wall braces 482 can be provided connected to the last corresponding pair of rib members 410 on each end of the spine member 460 and running towards the end walls 367 of the storage hopper 360. End braces 484 can be connected between the end wall braces 482 and the end walls 367.

Figure 15:
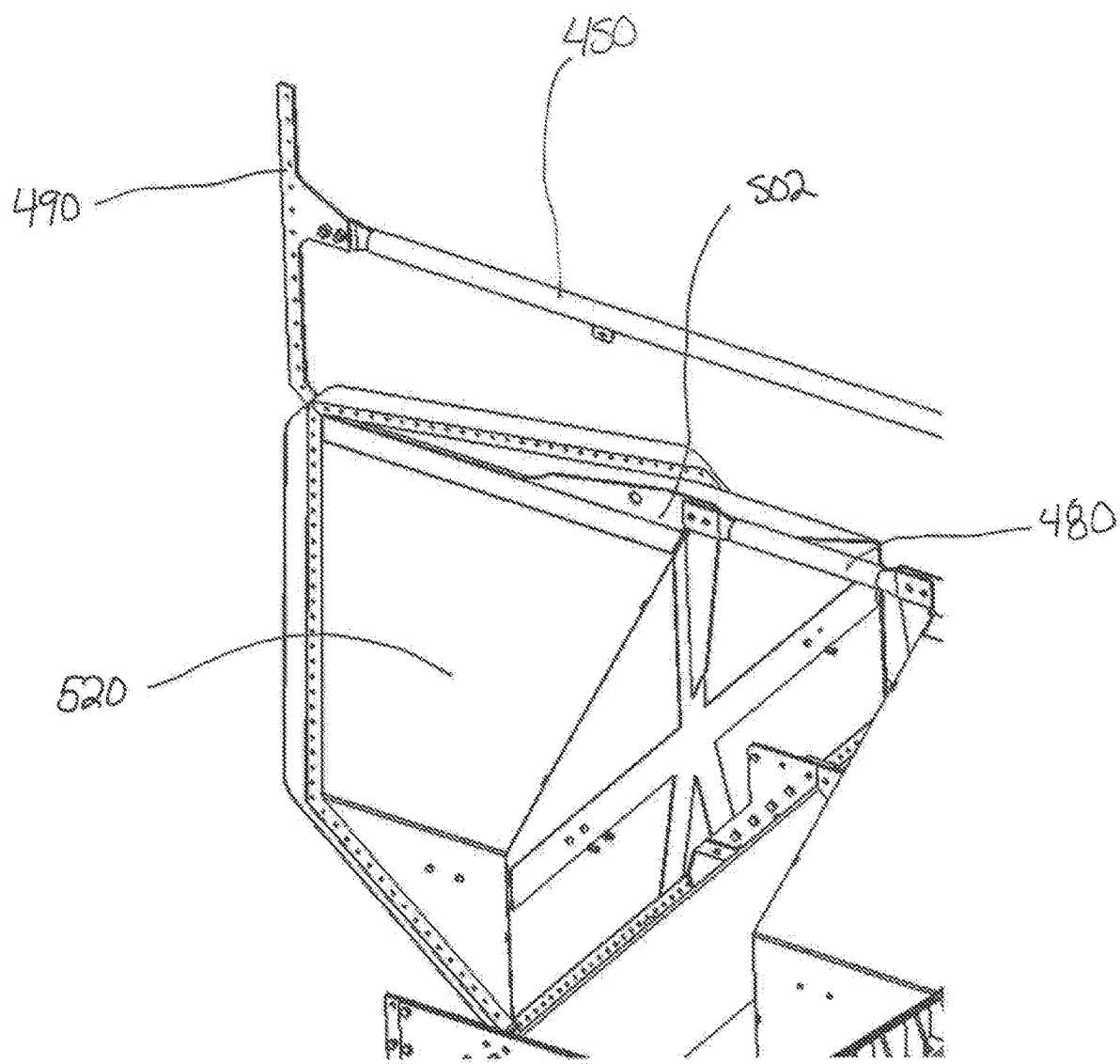
FIG. 15 is an isometric view of the wheel member of FIG. 14 with cross braces attached.

Referring to FIGS. 13 and 15, the lower wheel well brace 480 can be connected between the lower cross brace connections brackets 502 on the wheel well members 520. A wheel well rib member 490 can extend above the wheel well member 520 to connect adjacent panels 503A, 503B, together. An upper cross brace 450 can be connected between the wheel well rib members 490.

With the internal framework 400 assembled, as shown in FIG. 13, panels 500, 503A, and 503B can be attached to form the side walls 365 of the grain cart 300. Panels 500 can be attached to the rib members 410 extending towards the ends of the grain cart 300 and panels 503A, 503B can be inserted between a rib member 410 and the wheel well member 520.

Referring to FIG. 14, panels 503A, 503B can be shaped to accommodate the wheel well member 520, allowing the panels 503A, 503B to be connected between the wheel well member 520 and the adjacent rib member 410.

Referring to FIGS. 10-12, the outer surfaces of each panel 500, 503A, and 503B can be substantially aligned with the outer surfaces of adjacent panels 500, 503A, and 503B so that the outer surfaces of the panels 500, 503A, and 503B are substantially flush. The rib members 410 and the wheel well rib member 490, that the panels 500, 503A, and 503B are connected to, can be positioned so they do not extend beyond the outer surfaces of the panels 500, 503A, and 503B.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed:

1. A grain cart comprising:
a support frame;
ground wheels operatively attached to the support frame;
a hitch assembly connected to a front of the support frame;
a storage hopper supported on the support frame, the storage hopper comprising:
side walls;
end walls;
an interior portion defined by the side walls and the end walls;
a center portion at a bottom of the storage hopper;
a spine member running along the center portion;
corresponding pairs of rib members connected at intervals along the spine member, each rib member being substantially planar and having flange apertures running along an outside periphery of the rib member; and
a plurality of panels connected between adjacent rib members on a same side of the spine member to form the side walls, each panel having an outer surface, an inner surface, and a connection flange with apertures in the connection flange, the apertures in the connection flange aligning with the flange apertures of the rib members so that a connector, passing through one of the apertures in the connection flange and a corresponding flange aperture on a rib member, is parallel to an inner surface of the panel,
an auger assembly; and
a transport assembly provided beneath the storage hopper and leading to the auger assembly,
wherein for each rib member, the flange apertures are oriented on the rib member so that the rib member does not extend beyond the outer surfaces of a pair of adjacent panels connected to the rib member.

2. The grain cart of claim 1 wherein each rib member further comprises: a bottom end; and a top end.

3. The grain cart of claim 1 further comprising a cross brace connected between one of the corresponding pairs of rib members.

4. The grain cart of claim 3 further comprising: a lower cross brace; and, an upper cross brace, connected between the one of the corresponding pairs of rib members.

5. The grain cart of claim 1 further comprising a pair of ground wheels on each side of the grain cart, each pair of ground wheels encircled by a tread.

6. The grain cart of claim 1 wherein each side wall comprises: a substantially vertical upper side wall; and an angled inwards lower side wall.

7. The grain cart of claim 6 wherein at least one of the rib members comprises: a substantially vertical upper portion proximate the top end of the rib member; and, a slanted lower portion proximate the bottom end of the rib member.

8. The grain cart of claim 7 wherein the upper portion of the rib member corresponds to the upper side wall and the lower portion of the rib member corresponds to the lower side wall.

9. The grain cart of claim 1 wherein the spine member is over top of the transport assembly.

10. The grain cart of claim 9 wherein the spine member comprises openings leading to the transport assembly.

11. The grain cart of claim 10 wherein at least one of the openings is provided between adjacent rib members along a side of the spine member.

12. The grain cart of claim 1 wherein the spine member extends from a front end of the storage hopper to a back end of the storage hopper.

13. The grain cart of claim 1 wherein at least one of the pair of corresponding rib members comprise: an upper cross brace connection bracket proximate the top end of the rib member; and, a lower cross brace connection bracket provided below the upper connection bracket.

14. The grain cart of claim 13 wherein the upper cross brace connection bracket is provided in the upper portion of the rib member and the lower cross brace connection bracket is provided in the lower portion of the rib member.

15. The grain cart of claim 1 wherein an upper cross brace is connected between a corresponding pair of rib members, and a lower cross brace is connected between a corresponding pair of rib members.

16. The grain cart of claim 15 further comprising at least one bracing member connected between the upper cross brace and the lower cross brace of a corresponding pair of rib members.

17. The grain cart of claim 1 wherein each panel further comprises: a first side; a second side; a first connection flange running along the first side; and a second connection flange running along the second side.

18. The grain cart of claim 17 wherein at least one panel further comprises: a top section corresponding to the upper side wall of the storage hopper; and, a lower section corresponding to the lower side wall of the storage hopper.

19. The grain cart of claim 18 wherein the lower section is angled.

20. The grain cart of claim 1 wherein an outer surface of each panel is substantially aligned with the outer surfaces of adjacent panels.

21. The grain cart of claim 1 wherein outer surfaces of adjacent panels are substantially flush.

22. The grain cart of claim 1 further comprising a pair of wheel well members.

23. A method of constructing a storage hopper for a grain cart, the method comprising:
connecting a plurality of rib members to a spine member to form corresponding pairs of rib members on opposing sides of the spine member;

connecting a cross brace across each corresponding pair of rib members;

inserting panels between adjacent rib members on a same side of the spine member so that apertures in connection flanges of the panels align with flange apertures in the rib members; and connecting the panels to rib members by inserting connectors through one of the apertures in the connection flange of a panel and a corresponding flange aperture on a rib member so that the connector is parallel to an inner surface of the panel and using the connector to secure the panel to the rib member, wherein for each rib member, the flange apertures are oriented on the rib member so that the rib member does not extend beyond outer surfaces of a pair of adjacent panels connected to the rib member.

24. The method of claim 23 wherein the plurality of rib members connected at regular intervals along the spine member, the regular interval corresponding to a width of a panel.

25. The method of claim 23 wherein an outer surface of one of the plurality of panels is substantially aligned with the outer surfaces of adjacent panels.

26. The method of claim 24 wherein outer surfaces of adjacent panels are substantially flush.

* * * * *